2 Sheets—Sheet 1.

A. B. WILSON.

Sewing Machine.

No. 913.

Reissued Feb. 28, 1860.

N. PETERS, Photo-Lithographer, Washington, D. C.

2 Sheets—Sheet 2.

A. B. WILSON.

Sewing Machine.

No. 913. Reissued Feb. 28, 1860.

N. PETERS, Photo-Lithographer, Washington, D. C.

UNITED STATES PATENT OFFICE.

ALLEN B. WILSON, OF WATERBURY, CONN., ASSIGNOR, BY MESNE ASSIGNMENTS, TO THE WHEELER & WILSON MANUFACTURING COMPANY.

IMPROVEMENT IN SEWING-MACHINES.

Specification forming part of Letters Patent No. 8,296, dated August 12, 1851; Reissue No. 913, dated February 28, 1860

DIVISION A.

*To all whom it may concern:*

Be it known that I, ALLEN B. WILSON, formerly of Watertown, Litchfield county, Connecticut, but at present residing at Waterbury, Connecticut, have invented certain new and useful Improvements in Sewing-Machines; and I do hereby declare that the following specification, taken in connection with the drawings, is a full, clear, and exact desceiption thereof.

Figure 1:
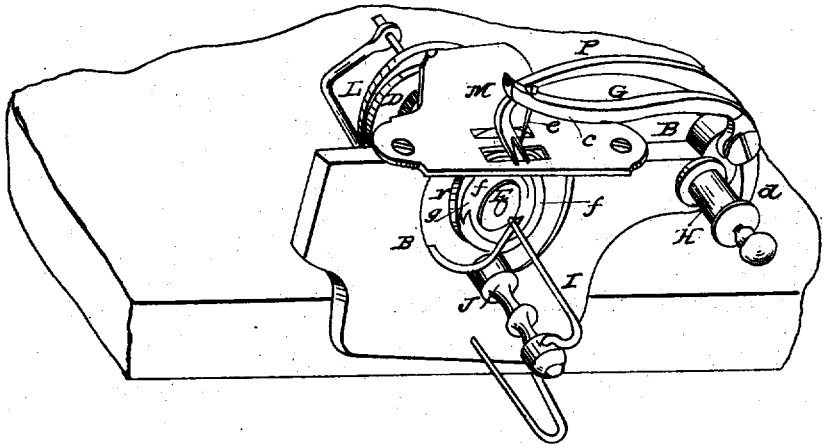
Figure 2:
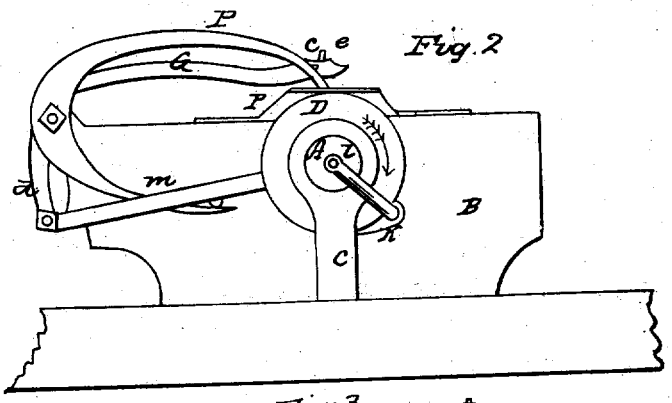
Figure 3:
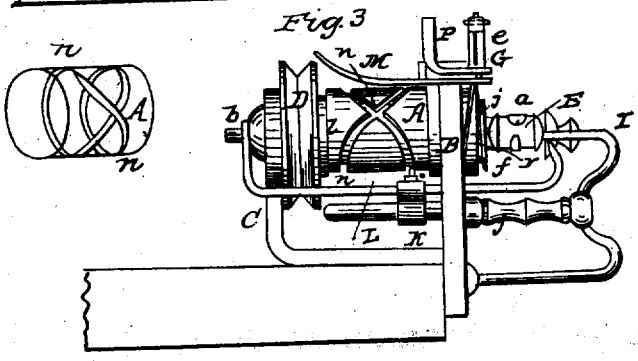
Figure 4:
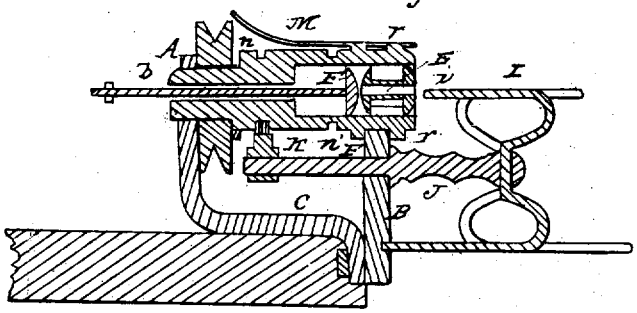
Figure 5:
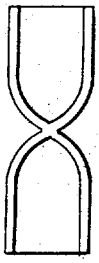
Figure 6:
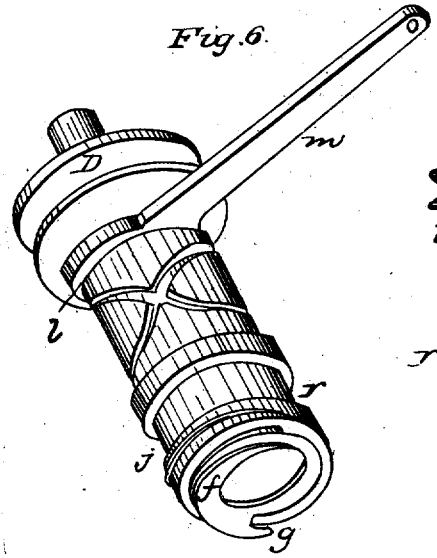
Figure 7:
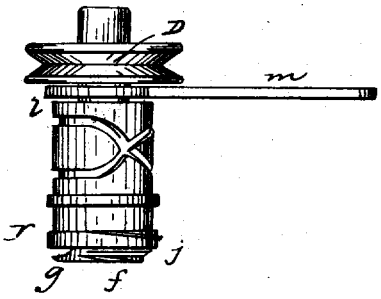

In the drawings, Figure 1 is a view in perspective of the whole machine. Fig. 2 is an end view or elevation thereof. Fig. 3 is a side elevation of the same. Fig. 4 is a longitudinal vertical section through the center of the revolving mandrel. Fig. 5 is a view of the groove in the mandrel, supposing the latter to be transparent, and a development of that groove in a plane surface. Fig. 6 is a perspective view, on a large scale, of a hook, mandrel, and feeding-screw, showing the groove in the mandrel; and Fig. 7, a side elevation thereof detached from other parts of the machine.

My sewing-machine which is the subject of the present description has, like my former machine, a table or support for the material to be sewed, a feeding mechanism to which that material is not attached and by which it is grasped, and a sewing or stitching mechanism proper; and the improvements which are herein set forth as of my own invention have for their objects the cheapening and simplifying of the machine, and to give it a capacity of more rapid sewing than has hitherto been attainable; and although there are various novelties in my machine, yet they are subordinate to two leading ideas in the process of stitching and feeding the material, which I believe to be new, and which have controlled the construction of this machine. These are, first, a mode of sewing by means of two threads in such manner that a slack loop of the upper or eye pointed needle thread, through which the lower thread is passed and which lies below the cloth, is taken up by a proper instrument below the cloth operating so as to draw through the cloth that loop of thread, thus tightening up the stitch that has been formed just previous to the one that the needle and instrument are then forming; and the second is a process of feeding and holding the cloth by means of proper instrumentalities in such manner that the cloth is confined or clamped fast between two surfaces while a feeding mechanism is withdrawn from the cloth and is returning to take a fresh hold of it; and to this end the nature of the first part of my invention consists in combining with a bobbin or its equivalent to furnish a lower thread, and a piercing-instrument carrying an upper thread, an instrument below the cloth so shaped and operated that the combination as a whole, being substantially as hereinafter described, shall form a stitch under the mode of operation hereinafter specified.

The nature of the second part of my invention consists in combining with a hook or its equivalent a reciprocating bobbin, the former having the office of seizing, spreading, and releasing a loop of needle-thread, and the latter operating to carry another thread which is interlocked with that loop, the combination being substantially such as set forth.

The third part of my invention is a revolving hook, substantially such as described, having a proper shape to seize a loop of thread, and a screw, groove, or feather, or any equivalent thereof, performing the duty of casting off a loop that has been seized.

The nature of the fourth part of my invention consists in combining with a hook, shaped and moved substantially as specified, or its equivalent for seizing a loop and spreading it under the mode of operation specified, an eye-pointed needle actuated by an eccentric or other equivalent motion, as distinguished from the cam-motion heretofore employed in sewing-machines, which causes a needle at times to rest and at others to move rapidly, the combination being substantially such as specified.

The nature of the fifth part of my invention consists in feeding the material to be sewed by a screw thread, in combination with a surface which, by a yielding pressure, clamps the material to be sewed onto the screw-thread at proper intervals, the combination being substantially as specified.

The nature of the sixth part of my invention consists in a spring-clamp or surface governed by a spring operated substantially as specified, so as to clamp the cloth fast to some other surface while a feeding instrument is out of engagement with the cloth and returning to engage with the cloth preparatory to moving the same.

The nature of the seventh part of my invention consists in arranging a hook, shaped and operating, substantially as specified, to perform the functions described in such relative position to a table and support for the cloth, and an eye-pointed needle, that the hook shall extend loops of needle-thread in planes perpendicular, or nearly so, to the plane of the material being sewed; and the nature of the last part of my invention consists in arranging the hook so as to move in a vertical plane, or nearly so, when combined with a horizontal shaft which actuates the feeding instrument, the hook, and the needle.

The precise machine exhibited in the drawings, which exemplifies a construction I have essayed with success to carry out my invention practically, is of small size and intended to be secured to a table, and is to be put in motion by means of an endless band or belt moved in some convenient manner and applied to a whirl or pulley, D, secured to the revolving mandrel. The frame of the machine consists of a face-plate, B, and an arm or bracket, C, in which, in suitable journals, is free to revolve a hollow mandrel, A, which by its revolution gives their proper motions to all parts of the machine. Near the pulley the mandrel is turned off eccentrically, and surrounding this eccentric is an eccentric ring, *l*, secured to a rod, *m*, the end of which is attached by a pivot to the tail *d* of a bent lever pivoted to some stationary part of the machine, and prolonged, as at G, till it reaches nearly over the point where the stitching is to be done. In the end of this prolongation is secured an eye-pointed needle—such as *e*—and the operation of the parts is such that the revolution of the mandrel causes the needle to pierce the cloth, pass its point below it, and then rise above the cloth again, there being no sudden pauses or stops in its motion, and only a gradual coming to rest as the eccentric passes centers, in the same way as is produced by an ordinary crank motion.

The table or platform of the machine is exhibited at M as held in position by an attachment to the face-plate. It lies above the mandrel, and has in it a slot through which the feeding-screw can rise to act upon the cloth. Upon this platform the cloth is to be laid, and the cloth is to be held down upon it by a spring-guard or presser-foot, P, slotted so as to admit of the passage of the needle, and, for the sake of convenience, formed as a bent lever pivoted in line with the axis of the needle-lever, and having a spring-tail which abuts against a pin, *x*.

Upon the revolving mandrel, just under the slot and the spring clamping-surface or presser-foot P, is a portion of a single turn of a screw-thread, *j*, formed upon a collar, *r*. This screw-thread in its revolution projects through the slot, thus pinching the cloth between itself and the presser-foot, and as the latter has a smooth surface the rotation of the screw carries the cloth along, while grasped between the screw-thread and the foot, to a distance depending upon the pitch of the screw and the portion of the whole circumference of the mandrel over which it extends. When the screw-thread, which projects through the table, comes in contact with the cloth, it lifts the presser-foot, so that it no longer clamps the cloth to the table, and when the screw disengages itself from the cloth the foot descends and clamps the cloth onto the table and the surface of the collar, if the latter be flush with the top of the table. The cloth is thus always held clamped to one spot when the feeding-instrument proper leaves it and until it takes a fresh hold, and this action is important as preventing any strain on the needle while in the cloth, as keeping the material firmly in the position where it was left by the feed, and as holding the various thickness in precise proper relative position while the stitch is being formed. The screw acts in conjunction with the presser-foot or spring-guard to feed the cloth while the needle is out of the latter, and the screw must bear the proper relative position to the eccentric to produce this effect at the proper time; and it will be noticed as one peculiarity of this feeding-instrument that it engages with the cloth only while feeding, and then leaves the cloth entirely while returning to make a fresh engagement or contact with it. Upon the revolving mandrel is formed another screw-thread, as at *f*, projecting at one end entirely beyond the mandrel and forming a hook, such as *g*. This screw-thread vanishes against the end or flat surface of the mandrel before it has passed entirely around or made one complete convolution, and as the mandrel revolves, the hook is so located that it will pass the needle in close proximity thereto, and on the side thereof farthest from the eccentric.

The mandrel is hollow, and in front of it, in line with its axis, is supported a rod, I, with one end, *i*, near the end of the mandrel. This rod is bent, as clearly shown in Fig. 4, and supported near its center in an arm, J, screwed into the face-plate and projecting inward so as to form a support and guide for a traverse-block, K, which slides upon it. The rod I may be turned at will into the position shown by faint lines in Fig. 4, and when in position as shown in Fig. 3 is held there by the lower end engaging in a shallow socket in the face-plate.

In the hollow of the mandrel rests a bobbin, E, having an axial aperture through it, and this bobbin can slide either in the hollow of the mandrel or on the rod, and its office is to hold the lower thread and carry it through loops of upper thread at proper intervals of time. In order that it may move as required for this latter duty, a piston, F, is located in the hollow of the mandrel and secured to a rod, *b*, which is attached to a wire, L, which is bent downward, thence extends horizontally through the traverse-block to which it is secured, and is further prolonged and bent upward till its end lies alongside of the rod I and in front of the bobbin, the shape being substantially such as is clearly shown in Fig. 3. The distance between the piston and the uppermost end of the wire is a little greater than the length of the spool, and as the piston and wire are in fact one piece, being joined together, they must, if reciprocated, push the bobbin off the rod into the hollow of the mandrel and out of that hollow onto the rod again. To secure such a reciprocation a groove shaped substantially as shown in Fig. 5 is formed in the surface of the mandrel, and into this groove projects a swinging traveler, *o*, fastened to the traverse-block. As the mandrel revolves, this groove, through the agency of the piston and wire, will, in a manner well known to mechanics, cause the bobbin to move to and fro rapidly, pausing for a considerable period at each end of its path, the groove being so shaped and located as to move the bobbin through a space a little greater than twice its own length, and to pass it alternately from opposite sides at proper times through loops of thread extended by the hook. This bobbin is to be supplied with thread, and has embracing it a spring friction-shield, *a*, with an eye in it, through which the thread passes to prevent it leaving the bobbin too freely. When the thread is used up, the bobbin may be removed by turning the rod I to the position shown by faint lines in Fig. 4, and moving the mandrel so that the piston will shove the bobbin out of the hollow. New thread can then be wound on it, the bobbin can be replaced when the piston is at the bottom of the hollow, and when the rod is turned back again and secured this part of the machine will again be ready for action.

The thread for the eye-pointed needle is to be wound upon a bobbin, A, attached in any suitable manner to any convenient part of the machine, and thence passed through an eye, *c*, in the needle-arm G, and finally through the eye of the eye-pointed needle. This bobbin is prevented from turning too freely by screwing it up against a leather washer.

In the machine thus described the same shaft gives motion to the feeding-instrument, to the hook, and to the needle, and, being horizontal, it can be driven directly from a horizontal counter-shaft to which treadles may be applied, thus constituting a cheap and simple machine, and it will further be perceived that the hook is so moved as to extend loops of needle-thread in planes perpendicular, or nearly so, to the plane of the table or the cloth being sewed. If this direction of the extension of the loops were altered, as it might be, the machine would of necessity become more complex.

Now, it will be perceived that there is in this machine no spring, or any equivalent therefor, above the cloth to govern the slack thread of the eye-pointed needle; that the length or extent of motion of the needle is very limited, and that this needle has no pauses in its motion, except when stopping prior to moving in a reverse direction at the two ends of its stroke, such pauses being due to the passing of centers of the eccentric, and nothing more, and all these new points arise from the new system of sewing with two threads invented by me.

The operation of this machine is as follows: The presser-foot is to be raised, and the material to be introduced between it and the table. The bobbins are to be supplied with thread, with the ends thereof passed as described, and motion is to be communicated to the mandrel in such direction as to cause the point of the hook, when above the axis of the mandrel, to advance toward the needle. The cloth will now be compressed firmly by the presser-foot onto the table. The needle, descending, will pierce it, carrying a bight of thread through the cloth, and when the needle has reached its lowest position the point of the hook passes between the needle and its thread, and by its motion draws out a loop of needle-thread as the needle rises. The outer part of this loop, as the hook revolves, lies in a straight line from the notch in the hook to the cloth, and the other part lies behind the screw-thread. As the hook revolves, this loop is extended, and when the hook has made about five-eighths of a revolution the loop is enlarged sufficiently to surround or encompass the bobbin, which then passes through the loop, thus interlocking its own thread in the loop of upper needle-thread. As the hook continues to revolve, part of the loop is thrown off by the vanishing of the screw-thread against the flat end of the mandrel, and the bight of it is released by the change of direction of the motion of the hook, and the needle has again entered the cloth and got to its lowest position. The hook then seizes another loop of needle-thread and extends it; but it extends that loop by drawing up the loop that the hook had just cast off and left slack below the cloth, so that the cast-off loop furnishes nearly all the thread for the new loop, and so that the cast-off loop is drawn through the cloth to form the new loop, conveying the lower thread into the cloth and tightening the stitch last made, and such is the action or mode of operation of a needle on one side and a proper instrument to draw up loops on the other side of the cloth as combined by me with a bobbin or vehicle for carrying a lower thread to form a lock-stitch. The peculiarity in the process by which this mode of operation may be identified is that there is below the cloth at the same time a loop in the act of being drawn up and a loop in the process of being extended, as just described. The stitch is, moreover, drawn up, not by the upward movement of the needle, but by an instrument acting below the cloth and drawing a loop of needle-thread through the cloth so far as to grip firmly the bobbin-thread and tighten the stitch made prior to that one which the needle and hook are then engaged in forming.

In the precise machine described, the cast off loop is drawn up to the cloth at one stitch through the interval between the bobbin and the bent end of its propelling-wire, and at the next stitch through the space between the bobbin and the piston. The screw for feeding is so located on the mandrel that the whole of its length shall be engaged with and act upon the cloth during the time that the needle is out of the cloth, the object being to prevent any interference between the feeding and sewing actions; and the cam-groove on the mandrel of the precise machine herein described is so constructed that the bobbin passes through loops of upper thread alternately from opposite sides.

A succession of motions of needle, hook, and bobbin operating conjointly, as before described, forms stitch after stitch, and owing to the fact that the bobbin has no agency in opening out a loop of needle-thread, as shuttles usually do, and that the hook is so shaped and actuated as to have the capacity of spreading a loop sufficiently large to surround a bobbin entirely, and irrespective of the motions and position of the needle, I am enabled to move the needle by an eccentric or equivalent motion, and, owing to the use of a hook, to draw out a loop from thread lying slack below the cloth, I am enabled to give to my needle a comparatively short range of motion, and by drawing up a double-thread stitch from the lower side I give it a better appearance than when drawn up from the upper side.

Having thus described my improvements in sewing-machines, I claim as of my own invention—

1. In combination, an eye-pointed needle carrying one thread, a hook properly shaped and moved, and a bobbin supporting and giving off a lower thread, the combination as a whole being substantially such as specified, and acting to make stitches under the mode of operation substantially as hereinbefore described.

2. The combination of a hook so shaped and moved as to spread a loop sufficiently to surround a bobbin, with a bobbin acting as specified, the combination being substantially such as recited hereinbefore, and acting so that a loop is seized, spread, and released with a bobbin-thread inclosed in it, and then drawn up tight by the hook.

3. A revolving hook so shaped as to operate, substantially in the manner specified, on loops of needle-thread.

4. A hook so shaped and moved as to spread a loop substantially in the manner set forth, in combination with an eye-pointed needle actuated by an eccentric or equivalent motion.

5. Feeding the material to be sewed step by step by an instrument operating and constructed substantially as described, for the purposes specified, in conjunction with a presser-foot or surface governed by a yielding force such as described.

6. A spring or yielding clamping-surface, when combined with another surface, so as to grasp cloth between them, and also with a feeding instrument, which is out of contact with the cloth when it is thus clamped, the operation being such that the cloth remains clamped, substantially in the manner and for the purposes specified, while the feeding instrument is out of contact or engagement with the cloth.

7. Arranging a hook that operates, substantially in the manner specified, in such relative position to a table for supporting cloth and to an eye-pointed needle that the former shall extend loops of needle-thread in planes perpendicular, or nearly so, to the plane of the cloth or material to be sewed, substantially as specified.

8. A horizontal shaft arranged beneath the platform or table of the machine, by which are actuated the needle, the hook, and the feeding-instrument, in combination with a hook which moves in a vertical plane, or nearly so, the combination being substantially such as is described.

In testimony whereof I have hereunto subscribed my name, in the city of Waterbury, on this 10th day of May, A. D. 1859.

ALLEN B. WILSON.

In presence of—
NORTON J. BUEL,
EDWARD B. COOKE.